Figures 1, 2:
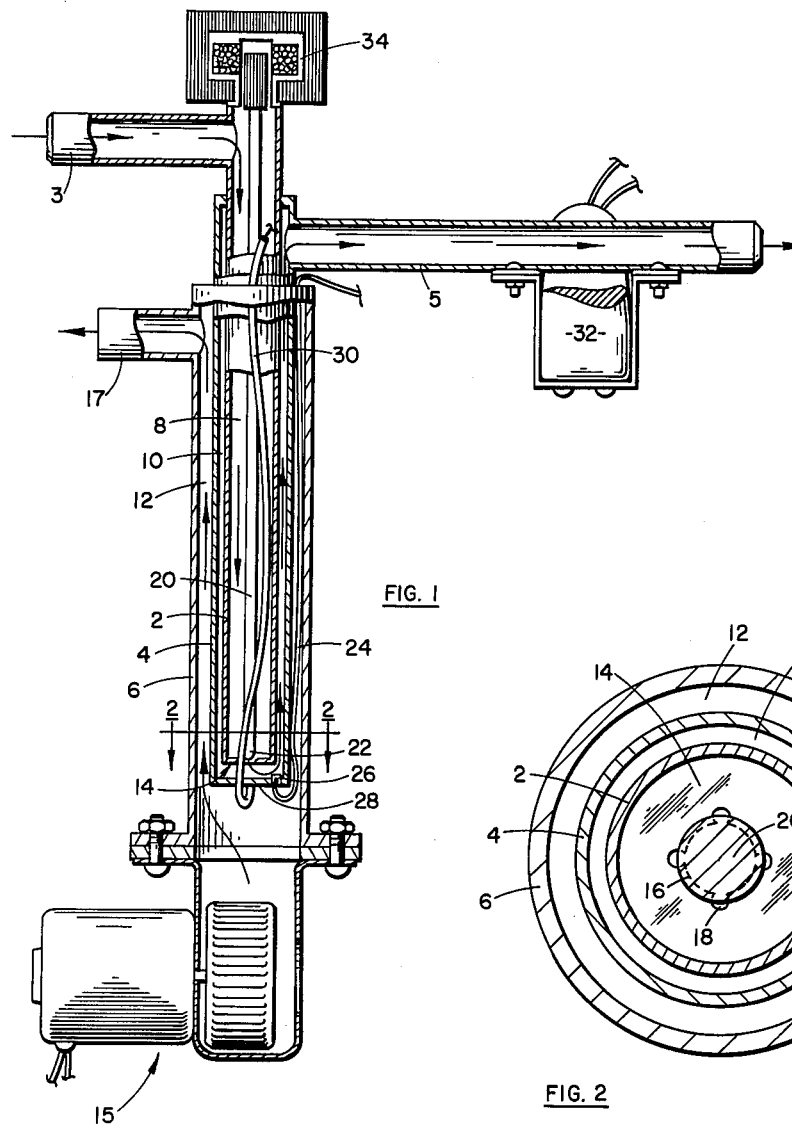

INVENTOR.
KARL A. DAVIS
BY
ATTORNEY

United States Patent Office 3,222,916
Patented Dec. 14, 1965

3,222,916
METAL OXIDE CONCENTRATION METER
Karl A. Davis, Woodland Hills, Calif., assignor to
North American Aviation, Inc.
Filed Feb. 12, 1962, Ser. No. 172,566
2 Claims. (Cl. 73—15)

My invention relates to a metal oxide concentration meter, and more particularly to a rapid-operating sodium oxide plugging meter.

Molten liquid metals, particularly alkali metals, have excellent heat transfer characteristics and low vapor pressure. They find usage as an industrial heat transfer agent, and as a coolant in nuclear reactors. Commercial sodium, however, contains small amounts of impurities and this impurity level usually increases during the initial charging and subsequent circulation of sodium in a coolant system. The chemically reactive nature of sodium coupled with the presence of oxygen makes sodium oxide an unavoidable contaminant. Sodium oxide is detrimental because it accelerates the corrosion rate of materials it contacts. The solubility of sodium oxide in sodium is temperature dependent, and it accordingly tends to precipitate in relatively cooler regions. Such accumulation, particularly in narrow passages, results in interference with coolant flow and causes corrosion of valves, seals, and pump members. For these reasons, sodium oxide concentration must be kept low, for example below about 10 parts per million.

Means of measuring sodium oxide, as well as removal by such means as cold-trapping, have been developed. Chemical analytical techniques for measuring sodium oxide concentration are not well suited to monitoring the oxide in a sodium process system. Other devices use the temperature solubility relation of sodium oxide in a plugging meter. They generally consist of a section of pipe fitting with a flow restriction, such as a perforated plate. Sodium flowing through this pipe section is cooled upstream relative to the orifice until the temperature reaches a value such that the oxide precipitates and plugs the orifice. The plugging temperature corresponds to a certain value of oxide concentration which can be determined by referring to a calibration curve relating oxide concentration to temperature.

Prior art plugging meters, while basically simple, have a number of drawbacks. The time required for running a measurement is impractically long; data are not sufficiently reproducible; premature precipitation of oxide occurs upstream of the plugging orifice, giving erratic results; and unplugging of the frozen, hard oxide, usually by application of heat to the plug, often requires considerable time and special effort incompatible with practical coolant system operation.

An object of my present invention, therefore, is to provide an improved plugging meter for the determination of metal oxide.

Another object is to provide a rapid mechanical means of unplugging the meter upon conclusion of the plugging measurement.

Another object is to provide a rapid-operating plugging meter having a small sodium flow rate to accomplish rapid cooling.

Still another object is to provide a sodium oxide plugging meter in which premature precipitation of oxide upstream of the plugging surfaces is avoided and all the oxide entering the meter is made available at the plugging orifice to precipitate in accordance with the prevailing temperature-solubility relationship.

Still another object is to provide such a meter in which all the oxide is made available to the plugging orifice by providing a short, low-volume cooling section preceding the orifice plate.

The above and other objects and advantages of my invention will become apparent from the following detailed description and the appended drawing.

In the drawing, FIG. 1 is an elevation view, partly in section, of my plugging meter and FIG. 2 is an enlarged section through FIG. 1 showing the plugging orifice.

Turning now to FIG. 1, two concentric tubes 2 and 4 are positioned within the tubular housing 6 thereby forming three annular regions 8, 10, and 12. The process stream sodium enters central tube 2 through a sidestream pipe 3 and flows down toward the orifice plate 14, following the flow path indicated by the arrows. After passing through the orifice plate, the sodium enters outer tube 4 and leaves the meter through pipe 5 which connects again with the main system. Heat from the sodium in central tube 2 flows to the sodium in the outer tube 4. Cooling air from a blower 15 is directed into the plugging orifice end of the meter through annulus 12 and out pipe 17, as shown by the arrows. This cooling arrangement results in the oxide concentration being greatest in the vicinity of the plugging orifice.

The design of the plugging orifice 14 is shown in FIG. 2, and comprises a central orifice 16 with at least one and preferably a plurality of radially-directed circular slots 18. A control rod 20 having a tapered or cone-shaped point 22 is adapted to be received by central orifice 16, so that the sodium then passes through outer holes 18 only. Movement of rod 20 is controlled by solenoid 34. A thermocouple 24, such as of Chromel-Alumel, is mounted in a thimble 26 positioned on a base plate 28 extending into the sodium, and senses temperature in the orifice region. An electrical heating element 30 extends to the region of the orifice plate and is attached to base plate 28. Flow is indicated by a flow meter 32 positioned downstream of the plugging meter.

In normal operation of the meter, the central orifice 16 is covered by the tip 22 of control rod 20, and when temperature is lowered below the temperature corresponding to saturation at the particular oxide concentration, precipitation will occur. This causes clogging or plugging of small holes 18, and hence stops the flow of sodium which is indicated by the flow meter. A record is made of the temperature at which plugging occurs and from this temperature the concentration of sodium oxide in the sodium is determined by reference to a standard calibration graph. The orifice is then unplugged by withdrawing rod 20 about ¼ inch with solenoid 34. The rod movement tends to physically break the oxide plug as well as open the orifice. Concurrently with the rod movement, heat is applied to the sodium to accelerate dissolving the oxide. The plugging meter is mounted vertically so that the normal (down) rod position is restored by gravity after unplugging.

In a preferred embodiment of my meter, the central hole of the plugging orifice is ⅛ inch in diameter and the four adjacent holes are 50 mils in diameter. The overall width of the meter including the flow meter and pipe stubs is approximately 13 inches and the overall length is approximately 30 inches. The total weight is approximately 25 lbs. The power required is 1000 watts at 230 volts for the heater, 55 watts at 110 volts for the blower, and 35 watts at 50 volts for the solenoid. The flow meter has a sensitivity of 6 millivolts per gallon per minute. With a flow rate of about 0.1 g.p.m. through the meter and cooling the sodium from 800° F. in suitable decrements, only about 5 minutes are required to obtain plugging. Likewise, the unplugging is rapid, as shown by the instantaneous flow increase and prompt temperature rise recorded upon opening the plugging orifice.

The foregoing embodiment is illustrative rather than restrictive of my invention. Various modifications may be made by those skilled in the art which are still within the scope of my invention, which should, accordingly, be limited only as is indicated in the appended claims.

I claim:
1. A sodium oxide plugging meter comprising:
 (a) an outer housing,
 (b) two tubular members positioned concentrically in said housing,
 (c) a sodium inlet line communicating with one end of the inner of said members,
 (d) a plate positioned at the other end of said inner member, said plate having a central orifice and a plurality of smaller, communicating orifices extending radially from said central orifice,
 (e) a sodium outlet line communicating with the outer of said concentric members for withdrawing sodium passed through said orifice plate,
 (f) a rod having a tapered end positioned axially in the inner tubular member, the tapered end of said rod being adapted to be received in said central orifice,
 (g) the other end of said rod extending into a solenoid, said solenoid controlling movement of said rod into and out of said orifice,
 (h) means for cooling sodium at said orifice plate,
 (i) means for sensing temperature of sodium in the vicinity of said plate, and
 (j) means for measuring the flow rate of sodium in said outlet line.

2. A liquid alkali metal plugging meter comprising:
 (a) a housing member,
 (b) a plate positioned transversely in said housing and having a central port with a plurality of communicating ports extending radially from said central port,
 (c) a movable rod axially positioned in said housing,
 (d) said rod being adapted to be received in said central port,
 (e) means for moving said rod into and out of said central port,
 (f) heater means in said housing member adjacent said plate,
 (g) cooling means spaced from said heater means and said plate,
 (h) said heating and cooling means adjusting the temperature of the liquid metal adjacent said plate,
 (i) means for sensing the temperature of the liquid metal adjacent said plate, and
 (j) flowmeter means cooperating with said housing for sensing the liquid metal flow rate through said plate.

References Cited by the Examiner
UNITED STATES PATENTS

| | | | |
|---|---|---|---|
| 2,651,194 | 9/1953 | Dickey et al. | 73—17 |
| 2,997,874 | 8/1961 | Billuris et al. | 73—17 X |
| 3,060,318 | 10/1962 | Ouvrard | 73—17 X |

RICHARD C. QUEISSER, *Primary Examiner.*

DAVID SCHONBERG, *Examiner.*